United States Patent
Yano

(10) Patent No.: US 9,751,327 B2
(45) Date of Patent: Sep. 5, 2017

(54) INK JET RECORDING METHOD

(71) Applicant: Seiko Epson Corporation, Tokyo (JP)

(72) Inventor: Takeshi Yano, Shioriji (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/711,283

(22) Filed: May 13, 2015

(65) Prior Publication Data

US 2015/0328904 A1   Nov. 19, 2015

(30) Foreign Application Priority Data

May 16, 2014   (JP) ................. 2014-102513

(51) Int. Cl.
| | |
|---|---|
| *B41J 2/21* | (2006.01) |
| *C09D 11/54* | (2014.01) |
| *C09D 11/30* | (2014.01) |
| *B41M 5/00* | (2006.01) |
| *B41J 11/00* | (2006.01) |

(52) U.S. Cl.
CPC .............. *B41J 2/2114* (2013.01); *B41J 2/21* (2013.01); *B41J 2/2107* (2013.01); *B41J 11/0015* (2013.01); *B41M 5/0017* (2013.01); *B41M 5/0047* (2013.01); *B41M 5/0064* (2013.01); *C09D 11/30* (2013.01); *C09D 11/54* (2013.01)

(58) Field of Classification Search
CPC ....................................................... B41J 2/2114
See application file for complete search history.

(56) References Cited

U.S. PATENT DOCUMENTS

| | | | | |
|---|---|---|---|---|
| 5,980,623 A * | 11/1999 | Hiraoka | ................. | C09D 11/40 106/31.48 |
| 6,328,438 B1 * | 12/2001 | Ozawa | .................. | B41J 2/2114 347/95 |
| 6,426,375 B1 * | 7/2002 | Kubota | .................. | B41J 2/2114 347/106 |

(Continued)

FOREIGN PATENT DOCUMENTS

| | | |
|---|---|---|
| EP | 1 041 126 A2 | 10/2000 |
| EP | 2 889 148 A1 | 7/2015 |

(Continued)

*Primary Examiner* — Shelby Fidler
(74) *Attorney, Agent, or Firm* — Nutter McClennon & Fish LLP

(57) ABSTRACT

An ink jet recording method includes attaching a reaction liquid and one or more ink jet ink compositions to a low-absorbing or non-absorbing recording medium, in which the reaction liquid contains a reactant which is a carboxylic acid or carboxylate that reacts with a component of the ink jet ink composition, the ink jet ink composition contains a resin and water, and when a deposition amount in an area in which the deposition amount of the resin is the greatest per unit area in a deposition area of the ink jet ink composition on the low-absorbing or non-absorbing recording medium is set to be 100%, the reaction liquid and the ink jet ink composition are deposited so that a mass ratio between the deposition amount of the resin and the deposition amount of the reactant (resin/reactant) in the deposition area in which the deposition amount of the resin is in a range of 20% to 100% is in a range of 1.5 to 16.

10 Claims, 1 Drawing Sheet

(56) References Cited

U.S. PATENT DOCUMENTS

| | | | |
|---|---|---|---|
| 2004/0113971 A1* | 6/2004 | Nakajima | B41J 11/002 347/29 |
| 2009/0233068 A1* | 9/2009 | Irita | C09D 11/54 428/211.1 |
| 2010/0166962 A1 | 7/2010 | Ohzeki | |
| 2012/0050386 A1* | 3/2012 | Shimizu | C09D 11/324 347/20 |
| 2012/0062679 A1* | 3/2012 | Yokota | B41J 11/0015 347/104 |
| 2013/0021398 A1* | 1/2013 | Mizes | B41J 2/2114 347/14 |
| 2015/0054883 A1* | 2/2015 | Okuda | C09D 11/40 347/20 |
| 2015/0174939 A1* | 6/2015 | Aoyama | C09D 11/322 347/21 |
| 2015/0273883 A1* | 10/2015 | Okuda | B41J 2/2114 347/21 |

FOREIGN PATENT DOCUMENTS

| | | |
|---|---|---|
| EP | 2 894 203 A1 | 7/2015 |
| JP | 2009-226599 A | 10/2009 |

\* cited by examiner

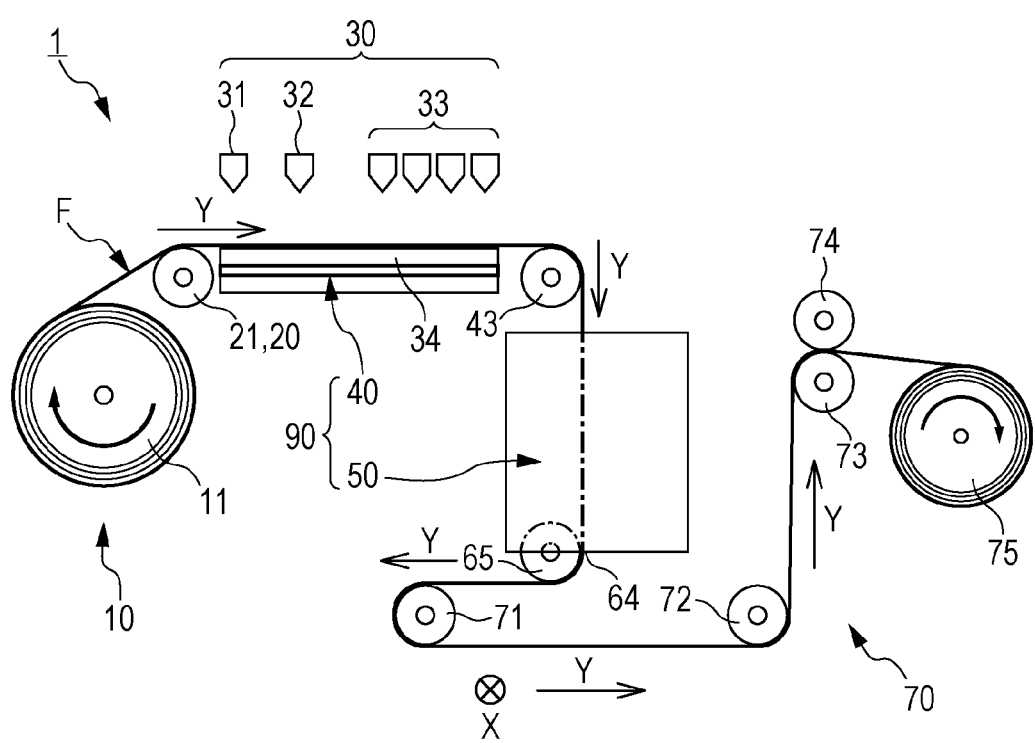

INK JET RECORDING METHOD

BACKGROUND

1. Technical Field

The invention relates to an ink jet recording method.

2. Related Art

In an ink jet recording method, a high resolution image can be recorded using a comparatively simple apparatus, and the ink jet recording methods are rapidly developing in various fields. Among the methods, various studies are performed in order to obtain recorded matter with a higher quality. For example, JP-A-2009-226599 provides an image recording method in which the generation of curls and cockling even in general purpose printing paper can be suppressed, and that includes a pretreatment liquid supplying step of supplying a pretreatment liquid containing a fluorine-based surfactant onto a recording medium, a reaction liquid supplying step of supplying a reaction liquid containing a reactant that comes into contact with an ink composition and generates aggregates on a recording medium to which the pretreatment liquid is supplied, and an ink supplying step that supplies the ink composition containing a colorant, resin fine particles, a water soluble organic solvent, and water onto the recording medium to which the pretreatment liquid is supplied.

However, if the recording method using a reaction liquid (pretreatment liquid) in the related art is used in a low-absorbing recording medium or a non-absorbing recording medium, the reaction liquid hardly penetrates the recording medium, so a bad odor caused by the reaction liquid becomes a problem. In addition, if the reaction liquid is not used, bleeding (there is portion in which ink is blurred near a pattern) easily occurs, and graininess (light and shade occur in development of ink composition inside a pattern so as to be seen as to be granular) is not likely to be suppressed.

SUMMARY

An advantage of some aspects of the invention is to provide an ink jet recording method in which an odor of a reactant can be decreased and a high definition recorded matter can be obtained.

The inventors of the invention have been earnestly studied to conceive the invention by adjusting a deposition amount of a reaction liquid and an ink composition on a recording medium using a predetermined reaction liquid.

That is, the invention is as follows.

[1]

According to an aspect of the invention, there is provided an ink jet recording method including attaching a reaction liquid and one or more ink jet ink compositions to a low-absorbing or non-absorbing recording medium, in which the reaction liquid contains a reactant which is a carboxylic acid or carboxylate that reacts with a component of the ink jet ink composition, the ink jet ink composition contains a resin and water, and when a deposition amount in an area in which the deposition amount of the resin is the greatest per unit area in a deposition area of the ink jet ink composition on the low-absorbing or non-absorbing recording medium is set to be 100%, the reaction liquid and the ink jet ink composition are deposited so that a mass ratio between the deposition amount of the resin and the deposition amount of the reactant (resin/reactant) in the deposition area in which the deposition amount of the resin is in a range of 20% to 100% is in a range of 1.5 to 16.

[2]

In the ink jet recording method according to [1], the reaction liquid and the ink jet ink composition are deposited so that the mass ratio between the deposition amount of the resin and the deposition amount of the reactant (resin/reactant) is in a range of 5.0 to 16.

[3]

In the ink jet recording method according to [1] or [2], the reaction liquid is deposited on the low-absorbing or non-absorbing recording medium in an ink jet system.

[4]

In the ink jet recording method according to any one of [1] to [3], the resin contains a resin fine particle or a water soluble resin.

[5]

In the ink jet recording method according to any one of [1] to [4], two or more ink jet ink compositions are deposited on the low-absorbing or non-absorbing recording medium, and the deposition amount of the resin is a total deposition amount of the resin included in the two or more ink jet ink compositions.

[6]

In the ink jet recording method according to any one of [1] to [5], the ink jet ink composition contains a clear ink composition.

[7]

In the ink jet recording method according to any one of [1] to [6], the resin contains a resin fine particle, and a particle diameter of the resin fine particle increases by 30 times or more in a first mixed liquid containing the resin fine particle and the reactant so that a solid content mass ratio (resin/reactant) is 3.

[8]

In the ink jet recording method according to any one of [1] to [7], the resin contains a water soluble resin; and a volume average particle diameter of the water soluble resin according to a light scattering method is 1000 nm or greater in a second mixed liquid containing the water soluble resin and the reactant so that a solid content mass ratio (resin/reactant) is 3.

[9]

In the ink jet recording method according to any one of [1] to [8], the deposition amount of the resin is in a range of 0.10 mg/inch$^2$ to 1.0 mg/inch$^2$, in a deposition area in which the deposition amount of the resin is 100%.

[10]

In the ink jet recording method according to any one of [1] to [9], the content of the resin is in a range of 0.50% by mass to 15% by mass with respect to a total amount of the ink jet ink composition.

[11]

In the ink jet recording method according to any one of [1] to [10], the content of the reactant is in a range of 0.50 parts by mass to 15.0 parts by mass, with respect to 100 parts by mass of a total amount of the reaction liquid.

[12]

In the ink jet recording method according to any one of [1] to [11], an amount of absorbed water of the low-absorbing or non-absorbing recording medium in a Bristow technique from a start of a contact to 30 msec is in a range of 0 mL/m$^2$ to 10 mL/m$^2$.

BRIEF DESCRIPTION OF THE DRAWING

The invention will be described with reference to the accompanying drawing, wherein like numbers reference like elements.

FIGURE is a side view schematically illustrating an example of an entire ink jet recording apparatus obtained by using an embodiment.

DESCRIPTION OF EXEMPLARY EMBODIMENTS

Hereinafter, an embodiment of the invention (hereinafter, referred to as "embodiment") is described in detail with reference to the drawing, if necessary. However, the invention is not limited thereto, and many modifications are possible without departing from the gist of the invention. In addition, in the drawing, the same elements are denoted by the same reference numerals, and repeated descriptions are omitted. In addition, positional relationships such as upward, downward, left, and right are based on the drawing, unless particularly described otherwise. Further, the numerical proportions in the drawing are not limited to the illustrated proportions. In addition, "(meth)acrylic resin" in the specification means both an acrylic resin and a methacrylic resin corresponding thereto.

Ink Jet Recording Method

An ink jet recording method according to the embodiment (hereinafter, also referred to as "recording method") includes a recording step of attaching a reaction liquid and one or more ink jet ink compositions (hereinafter, also referred to as "ink composition") to a low-absorbing or non-absorbing recording medium (hereinafter, collectively referred to as "recording medium"), the reaction liquid contains a reactant which is a carboxylic acid or carboxylate that reacts with a component of the ink jet ink composition, the ink jet ink composition contains a resin and water, and when a deposition amount in an area in which the deposition amount of the resin is the greatest per unit area in a deposition area of the ink jet ink composition on the low-absorbing or non-absorbing recording medium is set to be 100%, the reaction liquid and the ink jet ink composition are deposited so that a mass ratio between the deposition amount of the resin and the deposition amount of the reactant (resin/reactant) in the deposition area in which the deposition amount of the resin is in a range of 20% to 100% is in a range of 1.5 to 16.

If the low-absorbing or non-absorbing recording medium is used, the reactant hardly penetrates the medium and an odor of the reactant easily remains. In addition, the low-absorbing or non-absorbing recording medium hardly absorbs the ink composition so that bleeding occurs or graininess becomes worse. In contrast, according to the embodiment, if the carboxylic acid or the carboxylate that reacts with a component of the ink jet ink composition is used as the reactant and the mass ratio between the deposition amount of the resin and the deposition amount of the reactant in the deposition area in which the deposition amount of the resin is in the range of 20% to 100% is in the range described above, even if the low-absorbing or non-absorbing recording medium is used, the odor of the reactant is suppressed and the bleeding or the like can be controlled, so that a high definition recorded matter can be obtained.

Recording Step

The recording step is a step of depositing the reaction liquid and one or more ink compositions on the low-absorbing or non-absorbing recording medium. Specific examples thereof include an aspect of depositing the reaction liquid on the low-absorbing or non-absorbing recording medium and depositing one or more ink compositions on the deposition area of the reaction liquid, an aspect of depositing the ink composition on the low-absorbing or non-absorbing recording medium and depositing the reaction liquid on the deposition area of the ink composition, and an aspect of depositing both at the same time, and an aspect of depositing one or more ink compositions on the deposition area of the reaction liquid is preferable in that the image quality is further improved.

A method of depositing the reaction liquid is not particularly limited, and, for example, roller coating, spray coating, and ink jet coating can be used. Among them, a method of depositing the reaction liquid by ink jet coating is preferable. If the reaction liquid is deposited by ink jet coating, the reaction liquid deposition amount can be controlled depending on a reaction liquid deposited area on the recording medium.

Low-Absorbing or Non-Absorbing Recording Medium

If the low-absorbing or non-absorbing recording medium is used, since the surface repels the reaction liquid, the reactant may not be evenly coated, bleeding more easily occurs, aggregability more easily deteriorates, and an odor inherent in the reactant is more easily generated. Therefore, the invention is particularly useful.

An example of the low-absorbing recording medium includes paper of which the aesthetic or the smoothness is enhanced by coating paint on the surface thereof, the paper which is classified as coated printing paper in "Production dynamic statistics classification" of the Ministry of Economy, Trade and Industry. Examples of the paint include a paint obtained by mixing a white pigment such as clay (kaolin) or calcium carbonate with an adhesive agent (binder) such as starch. As the coating amount of the paint, a range of about 10 to 40 $g/m^2$ is preferable. As a specific example of the low-absorbing recording medium, printing paper such as art paper, coated paper, matte paper, and cast paper is included.

In addition, the non-absorbing recording medium is not particularly limited, but examples thereof may include a plastic film not having an ink absorbing layer, a medium obtained by coating plastic on the base material such as paper, or a medium to which a plastic film is bonded. The examples of the plastic described herein include polyvinyl chloride, polyethylene terephthalate, polycarbonate, polystyrene, polyurethane, polyethylene, polypropylene, and polyacryl.

Among them, if a non-absorbing recording medium is used, a recorded matter having excellent water resistance and abrasion resistance can be obtained. However, since it is more difficult for the ink composition to be absorbed, the image quality has to be enhanced and the odor has to be decreased. Therefore, the invention is more useful. Among non-absorbing recording media, a film-based recording medium such as a plastic film is more preferable.

Here, the "low-absorbing recording medium" or the "non-absorbing recording medium" refers to a recording medium of which an amount of absorbed water in a Bristow technique from a start of a contact to 30 msec is 10 $mL/m^2$ or less. The amount of absorbed water of the low-absorbing or non-absorbing recording medium in a Bristow technique from a start of a contact to 30 msec is preferably in the range of 0 $mL/m^2$ to 10 $mL/m^2$, more preferably in the range of 0 $mL/m^2$ to 7 $mL/m^2$, and still more preferably in the range of 0 $mL/m^2$ to 5 $mL/m^2$. If the amount of absorbed water is 10 $mL/m^2$ or less, the reactant and the ink composition are hardly absorbed in the recording medium. Therefore, the invention is particularly effective.

The Bristow technique is widely spread as a method for measuring a liquid absorption amount in a short time, and is adopted by the Japan Technical Association of the Pulp and Paper Industry (JAPAN TAPPI). The details of the test method are described in Standard No. 51 "Paper and Paperboard-Liquid Absorbency Test Method-Bristow Method" of "Japan TAPPI Paper and Pulp Test Methods 2000".

In addition, the non-absorbing recording medium or the low-absorbing recording medium can be classified by wettability of the recording surface to water. For example, a water droplet of 0.5 μL is dripped onto the recording surface of the recording medium, and the rate of decrease of the contact angle (comparison between the contact angle at 0.5 milliseconds and the contact angle at 5 seconds after the landing) is measured so as to characterize the recording medium. More specifically, as the character of the recording medium, the "non-absorbing property" of the "non-absorbing recording medium" refers to a character in which the rate of decrease is less than 1%, and the "low-absorbing property" of the "low-absorbing recording medium" is a character in which the rate of decrease is in the range of 1% to less than 5%. In addition, the absorbing property refers to a characteristic in which the rate of decrease is 5% or greater. In addition, the contact angle can be measured by using a portable contact angle meter PCA-1 (manufactured by Kyowa Interface Science Co., Ltd.) or the like.

Reaction Liquid

The reaction liquid contains a reactant which is a carboxylic acid or carboxylate that reacts with a component of the ink jet ink composition. If the reactant in the reaction liquid interacts (reacts) with a component contained in the ink composition, the ink composition is thickened or insolubilized. Accordingly, bleeding of the deposited ink composition can be prevented so that the graininess can also be suppressed.

Carboxylic Acid

The carboxylic acid is not particularly limited, but examples thereof include formic acid, acetic acid, benzoic acid, oxalic acid, malonic acid, and citric acid. Among these, uni- or higher-valent carboxylic acid is preferable. If such a carboxylic acid is included, bleeding of the obtained recorded matter can be further prevented so that the graininess can be further suppressed. In addition, the carboxylic acid may be used singly, or two or more types thereof may be used in combination.

The content of the carboxylic acid is preferably in the range of 0.50 parts by mass to 15.0 parts by mass, more preferably in the range of 0.75 parts by mass to 10.0 parts by mass, and still more preferably in the range of 1.0 part by mass to 7.0 parts by mass with respect to 100 parts by mass of the reaction liquid. If the content of the carboxylic acid is 0.50 parts by mass or greater, the bleeding of the obtained recorded matter can be further prevented, and the graininess can be further suppressed. In addition, if the content of the carboxylic acid is 5.0 parts by mass or less, the odor can be further decreased.

Carboxylate

The carboxylate is not particularly limited, but examples thereof include salts of carboxylic acid with alkaline earth metals (for example, magnesium and calcium) in Group II of the periodic table, transition metals (for example, lanthanum) in Group III of the periodic table, earth metals (for example, aluminum) in Group XIII of the periodic table, and lanthanides (for example, neodymium). More specifically, calcium acetate, magnesium acetate, and the like are included. In addition, the carboxylate may be used singly, or two or more types thereof can be used in combination.

The content of the carboxylate is preferably in the range of 0.50 parts by mass to 15.0 parts by mass, more preferably in the range of 0.75 parts by mass to 10.0 parts by mass, and still more preferably in the range of 1.0 part by mass to 7.0 parts by mass with respect to 100 parts by mass of the reaction liquid. If the content of the carboxylate is 0.50 parts by mass or greater, the bleeding of the obtained recorded matter can be further prevented, and the graininess can be further suppressed. In addition, if the content of the carboxylate is 5.0 parts by mass or less, the odor can be further suppressed.

The total content of the reactant is preferably in the range of 0.50 parts by mass to 15.0 parts by mass, more preferably in the range of 0.75 parts by mass to 10.0 parts by mass, and still more preferably in the range of 1.0 part by mass to 7.0 parts by mass with respect to 100 parts by mass of the reaction liquid. If the content of the reactant is 0.50 parts by mass or greater, the bleeding of the obtained recorded matter can be further prevented, and the graininess is further suppressed. In addition, if the content of the reactant is 15.0 parts by mass or less, the odor can be further suppressed.

The reaction liquid can include additional components, if necessary. The additional components are not particularly limited, and the examples thereof include water, a penetrating solvent, and a humectant.

Water

Examples of water include pure water such as ion exchanged water, ultra-filtered water, reverse osmosis water, and distilled water and water from which as much ionic impurities have been removed as possible, such as ultrapure water. In addition, if water sterilized by ultraviolet ray irradiation or the addition of hydrogen peroxide is used, when the reaction liquid is preserved for a long time, generation of fungi and bacteria can be prevented. Accordingly, the preservation stability can be further enhanced.

The content of water is preferably in the range of 55 parts by mass to 85 parts by mass, more preferably in the range of 60 parts by mass to 80 parts by mass, and still more preferably in the range of 65 parts by mass to 75 parts by mass with respect to 100 parts by mass of the reaction liquid.

Penetrating Solvent

The penetrating solvent is not particularly limited, and the examples thereof include alkyldiols such as 1,2-pentanediol, 1,2-hexanediol, 1,3-propanediol, 1,4-butanediol, 1,5-pentanediol, 1,6-hexanediol, 1,7-heptanediol, and 1,8-octanediol; and glycol ethers such as ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, and dipropylene glycol monobutyl ether.

The content of the penetrating solvent is preferably in the range of 0.50 parts by mass to 12.5 parts by mass, more preferably in the range of 1.0 part by mass to 10 parts by mass, and still more preferably in the range of 2.5 parts by mass to 7.5 parts by mass with respect to 100 parts by mass of the reaction liquid.

Humectant

The humectant is not particularly limited, and examples thereof include ethylene glycol, propylene glycol, diethylene glycol, triethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycol having a number average molecular weight of 2000 or less, 1,3-propylene glycol, isopropylene glycol, isobutylene glycol, glycerin, meso-erythritol, and pentaerythritol.

The content of the humectant is preferably in the range of 5.0 parts by mass to 35 parts by mass, more preferably in the range of 10 parts by mass to 30 parts by mass, and still more preferably in the range of 15 parts by mass to 25 parts by mass with respect to 100 parts by mass of the reaction liquid.

Ink Jet Ink Composition

The ink jet ink composition contains a resin and water. The same kinds of water as described for the reaction liquid can be used as water in the ink jet ink composition. The ink jet ink composition contains a component that reacts with the reactant, the ink composition comes into contact with the reaction liquid on the recording medium, and thus the component of the ink composition is thickened or insolubilized so as to be solidified at an early stage so that the image quality can be enhanced. Examples of the component include a coloring material such as a pigment and the resins described above.

Resin

If the ink composition contains the resin, the image quality can be enhanced and the odor can be reduced. Among the resins, a resin that reacts with the reactant is preferable. The resins are not particularly limited, and examples thereof include a resin fine particle or water soluble resins such as a resin emulsion and a resin dispersion which are generally used in an aqueous ink composition. The resins are not particularly limited, but examples thereof include a polyolefin resin, a (meth)acrylic resin, a polyurethane resin, a polyester resin, a vinyl resin, and a copolymer resin thereof, and an ionomer. The resins may be used for the purpose of supplying abrasion resistance, an adhesion property, and glossiness. The expression "to react with a reactant" refers to being mixed with a reactant to be thickened or insolubilized.

Resin Fine Particle

The resin fine particle is not particularly limited, and examples thereof include a polyolefin resin fine particle, a polyurethane resin fine particle, and a (meth)acrylic resin fine particle. Among them, the anionic resin fine particle having an anionic polar group such as a carboxyl group or a phosphate group, and the self-dispersion resin fine particle are preferable. Here, the "self-dispersing resin" refers to a resin that does not require a dispersing assistant and that can disperse itself.

The polyolefin resin fine particle is not particularly limited, and examples thereof include Chemipearl 5650 and Chemipearl S75N (Product name: manufactured by Mitsui Chemicals, Inc.) and AQUACER 515 (Product name: manufactured by BYK-Chemie GmbH).

Examples of the urethane resin fine particle include a urethane resin emulsion. The urethane resin emulsion is not particularly limited, as long as the urethane resin emulsion has a urethane bond in a molecule, and examples thereof include a polyether urethane resin containing an ether bond in a main chain, a polyester urethane resin containing an ester bond in a main chain, and a polycarbonate urethane resin having a carbonate bond in a main chain. The commercially available products of the urethane resin emulsion are not particularly limited, and examples thereof include Sancure 2710 (Product name: manufactured by The Lubrizol Corporation), Permarine UA-150 (Product name: manufactured by Sanyo Chemical Industries, Ltd.), Superflex 460, 470, 610, and 700 (Product name: manufactured by Dai-ichi Kogyo Seiyaku Co., Ltd.), NeosRez R-9660, R-9637, and R-940 (Product name: manufactured by Kusumoto Chemicals, Ltd.), Adeka Bontighter HUX-380 and 290K (Product name: manufactured by Adeka), Takelac (Registered Trademark) W-605, W-635, and WS-6021 (Product name: manufactured by Mitsui Chemicals, Inc.), and Polyether (Product name: manufactured by Taisei Finechemical Co., Ltd., Tg=20° C.)

An example of the acrylic resin fine particle includes an acrylic resin emulsion. The acrylic resin emulsion is not particularly limited, but examples thereof include a product obtained by polymerizing a (meth)acrylic monomer such as a (meth)acrylic acid and (meth)acrylic acid ester and a product obtained by copolymerizing a (meth)acrylic monomer and other monomers. Commercially available products of the acrylic resin fine particle is not particularly limited, and the examples thereof include Mowinyl 966A (Product name: manufactured by Nippon Synthetic Chemical Industry Co., Ltd.), Microgel E-1002 and Microgel E-5002 (Product name: manufactured by Nippon Paint Co., Ltd.), Voncoat 4001 and Voncoat 5454 (Product name: manufactured by DIC Corporation), SAE1014 (Product name: manufactured by Zeon Corporation), Saibinol SK-200 (Product name: manufactured by Saiden Chemical Industry Co., Ltd.), Joncryl 7100, Joncryl 390, Joncryl 711, Joncryl 511, Joncryl 7001, Joncryl 632, Joncryl 741, Joncryl 450, Joncryl 840, Joncryl 62J, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, and Joncryl 7610 (Product name: manufactured by BASF Corporation), and NK binder R-5HN (Product name: manufactured by Shin-Nakamura Chemical Co., Ltd., solid content of 44%).

Among them, at least one selected from the group consisting of a (meth)acrylic resin and a styrene-(meth)acrylic acid copolymer resin is preferable, and at least one selected from the group consisting of an acrylic resin and a styrene-acrylic acid copolymer resin is more preferable, and a styrene-acrylic acid copolymer resin is still more preferable. In addition, the copolymer may be any one of a random copolymer, a block copolymer, an alternating copolymer, and a graft copolymer.

The resin fine particle may be used singly, or two or more types thereof may be used in combination.

In the first mixed liquid containing the resin fine particle and magnesium acetate as the reactant so that the solid content mass ratio (resin/reactant) is 3, the particle diameter of the resin fine particle increases preferably by 30 times or more, more preferably by 100 times or more, still more preferably by 150 times or more, and further more preferably by 300 times or more. The upper limit of the increase of the particle diameter is not particularly limited, but the upper limit may be 1000 times or less. Here, the basis of "one time" is a particle diameter of the resin fine particle in the ink composition. If the resin fine particle of which the particle diameter increases by 30 time or more is used, the odor can be further suppressed. The particle diameter of the resin fine particle and the increase of the particle diameter in the first mixed liquid can be measured by the method described in the embodiment. Also, a reactant used in the recording may be the same as or different from the reactant described above. If the reactant used in the recording is the same as the reactant described above, the particle diameter increases in substantially the same manner, but also in the case in which a different reactant is used, the method is useful for finding the degree of the reactivity of the resin fine particle. The resin of which the particle diameter of the resin fine particle increases when the resin fine particle are brought into the mixed liquid in the method described above is referred to as a resin that reacts with the reactant.

The content of the resin fine particle is preferably in the range of 0.050 parts by mass to 17.5 parts by mass, more preferably in the range of 0.10 parts by mass to 15 parts by mass, and still more preferably in the range of 0.50 parts by mass to 12.5 parts by mass with respect to 100 parts by mass of the ink composition. If the content of the resin in the resin fine particle is in the range described above, the enhancement of the image quality and the decrease of the odor can be more excellent and the ejection stability and the preservation stability can be also excellent.

Water Soluble Resin

The water soluble resin is not particularly limited, and examples thereof include polyvinyl alcohols, a poly(meth)acrylic acid, a (meth)acrylic acid-acrylonitrile copolymer, a vinyl acetate-(meth)acrylic acid ester copolymer, a (meth)acrylic acid-(meth)acrylic acid ester copolymer, a styrene-(meth)acrylic acid copolymer, a styrene-methacrylic acid-acrylic acid ester copolymer, a styrene-α-methylstyrene-(meth)acrylic acid copolymer, a styrene-α-methylstyrene-(meth)acrylic acid-(meth)acrylic acid ester copolymer, a styrene-maleic acid copolymer, a styrene-maleic anhydride copolymer, a vinylnaphthalene-(meth)acrylic acid copolymer, vinylnaphthalene-maleic acid copolymer, a vinyl acetate-maleic acid ester copolymer, a vinyl acetate-crotonic acid copolymer, and a vinyl acetate-(meth)acrylic acid copolymer, and salts thereof. Any one of a random copolymer, a block copolymer, an alternating copolymer, and a graft copolymer can be used as the form of the copolymer.

The salts described above are not particularly limited, and examples thereof include salts of a basic compound such as ammonia, ethylamine, diethylamine, triethylamine, propylamine, isopropylamine, dipropylamine, butylamine, isobutylamine, diethanolamine, triethanolamine, triisopropanolamine, aminomethyl propanol, and morpholine.

Among them, an anionic resin having an anionic polar group such as a carboxyl group is preferably used as the water soluble resin.

In the second mixed liquid containing the water soluble resin and magnesium acetate as the reactant so that the solid content mass ratio (resin/reactant) is 3, the volume average particle diameter of the water soluble resin according to a light scattering method is preferably 1000 nm or greater, more preferably 1500 nm or greater, still more preferably 2000 nm or greater, and further more preferably 3000 nm or greater. The upper limit of the volume average particle diameter of the water soluble resin is not particularly limited, but is preferably 100 μm or less. The volume average particle diameter of the water soluble resin can be obtained by the following method. That is, the aqueous resin solution containing 0.5% by mass of the water soluble resin and the aqueous solution containing 3% by mass of magnesium acetate as the reactant are mixed so that the solid content mass ratio of the water soluble resin and the reactant (resin/reactant) is 3, to prepare the mixed liquid. The volume average particle diameter of the water soluble resin in the mixed liquid is measured by a method in the same manner as for the resin fine particle. The resin of which the particle diameter of the volume average particle diameter of the mixed liquid when the water soluble resin is brought into the mixed liquid in the method described above is 10 nm or greater is referred to as a resin that reacts with the reactant.

The content of the water soluble resin is preferably in the range of 0.050 parts by mass to 17.5 parts by mass, more preferably in the range of 0.10 parts by mass to 15 parts by mass, and still more preferably in the range of 0.50 parts by mass to 12.5 parts by mass with respect to 100 parts by mass of the ink composition. If the content of the water soluble resin is in the range described above, the enhancement of the image quality and the decrease of the odor are more excellent, and the ejection stability and the preservation stability of the ink composition can be more excellent.

The total content of the resin is preferably in the range of 0.050 parts by mass to 17.5 parts by mass, more preferably in the range of 0.10 parts by mass to 15 parts by mass, and still more preferably in the range of 0.50 parts by mass to 15 parts by mass with respect to 100 parts by mass of the ink composition. If the total content of the resin is 0.050 parts by mass or greater, the odor can be further suppressed. In addition, if the total content of the resin is 17.5 parts by mass or less, the enhancement of the image quality and the decrease of the odor are further excellent, and the ejection stability and the preservation stability of the ink composition can be more excellent.

Additional Components

The ink composition may appropriately contain various additives such as a coloring material such as a pigment or a dye, a surfactant, a penetrating solvent, a humectant, a dissolution assistant, a viscosity modifier, a pH regulator, an antioxidant, a preservative, an anti-mold agent, a corrosion inhibitor, and a chelating agent for capturing metal ions that have an influence on dispersion. In addition, as the penetrating solvent and the humectant, the products as described for the reaction liquid can be used, and the penetrating solvent and the humectant used in the ink composition and the reaction liquid may be the same or may be different.

Pigment

The pigment is not particularly limited, and examples thereof include the following.

Carbon black used as black ink is not particularly limited, and examples thereof include No. 2300, No. 900, MCF88, No. 33, No. 40, No. 45, No. 52, MA7, MA8, MA100, No. 2200B, and the like (above are manufactured by Mitsubishi Chemical Corporation), Raven 5750, Raven 5250, Raven 5000, Raven 3500, Raven 1255, Raven 700, and the like (above are manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by CABOT JAPAN K.K.), and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (above are manufactured by Degussa).

The pigment used as white ink is not particularly limited, and examples thereof include C. I. Pigment White 6, 18, and 21, titanium oxide, zinc oxide, zinc sulfide, antimony oxide, zirconium oxide, white hollow resin particles and polymer particles.

The pigment used as yellow ink is not particularly limited, and examples thereof include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

The pigment used as magenta ink is not particularly limited, but examples thereof include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245, and C. I. Pigment Violet 19, 23, 32, 33, 36, 38, 43, and 50.

The pigment used as cyan ink is not particularly limited, and examples thereof include C. I. Pigment Blue 1, 2, 3, 15, 15:1, 15:2, 15:3, 15:34, 15:4, 16, 18, 22, 25, 60, 65, and 66, and C. I. Vat Blue 4 and 60.

In addition, the pigments except the above are not particularly limited, but examples thereof include C. I. Pigment Green 7,10, C. I. Pigment Brown 3, 5, 25, and 26, and C. I. Pigment Orange 1, 2, 5, 7, 13, 14, 15, 16, 24, 34, 36, 38, 40, 43, and 63.

The content of the pigment is preferably in the range of 1.0 part by mass to 10 parts by mass, more preferably in the range of 1.0 part by mass to 8.0 parts by mass, and still more preferably in the range of 2.0 parts by mass to 6.0 parts by mass with respect to 100 parts by mass of the ink composition. If the content of the pigment is in the range described above, the color development can be further enhanced. Among the pigments, a pigment that reacts with the reactant is preferable in that the image quality is further enhanced. If the reactivity of a pigment that reacts with the reactant is checked in the same manner as the method of checking the reactivity of the resin fine particle according to the embodiment by using a method obtained by substituting the solid content of the resin with the solid content of the pigment, the particle diameter of the pigment in the case where the particle diameter of the pigment is measured in the same manner as that when measuring the particle diameter of the resin fine particle can be decided according to the same determination as in the particle diameter of the resin fine particle.

The ink jet ink composition may contain the clear ink composition. If the clear ink is used in an area in which the deposition amount of the color ink is small, the mass ratio between the deposition amount of the resin and the deposition amount of the reactant (resin/reactant) also in the corresponding area can be easily controlled. Here, the "clear ink" is not ink to be used for applying a color on a recording medium, but ink to be used for another purpose. The purpose is to adjust the glossiness of the recording medium, to enhance characteristics such as the abrasion resistance of the recorded matter, or to enhance the fixability or the color development of the color ink. The clear ink is preferably an ink composition in which the content of the coloring material is 0.1% by mass or less, and is more preferably an ink composition that does not contain a coloring material.

Surfactant

The surfactant is not particularly limited, but examples thereof include an acetylene glycol-based surfactant, a fluorine-based surfactant, and a silicone-based surfactant.

The acetylene glycol-based surfactant is not particularly limited, and the acetylene glycol-based surfactant is preferably at least one selected from the group consisting of 2,4,7,9-tetramethyl-5-decyne-4,7-diol, an alkylene oxide adduct of 2,4,7,9-tetramethyl-5-decyne-4,7-diol, 2,4-dimethyl-5-decyne-4-ol, and an alkylene oxide adduct of 2,4-dimethyl-5-decyne-4-ol. Commercially available products of the fluorine-based surfactant are not particularly limited, and examples thereof include those in the Olfine 104 series or the E series such as Olfine E1010 (Product name: manufactured by Air Products Japan, Inc.), Surfynol 465 or Surfynol 61 (Product name: manufactured by Nissin Chemical Industry Co., Ltd.). The acetylene glycol-based surfactant may be used singly, or two or more types thereof may be used in combination.

The fluorine-based surfactant is not particularly limited, and examples thereof include a perfluoroalkyl sulfonate, a perfluoroalkyl carboxylate, a perfluoroalkyl phosphoric acid ester, a perfluoroalkyl ethylene oxide adduct, a perfluoroalkyl betaine, and a perfluoroalkyl amine oxide compound. Commercially available products of the fluorine-based surfactant are not particularly limited, and examples thereof include S-144 and S-145 (manufactured by Asahi Glass Co., Ltd.); Fluorad FC-170C, FC-430, and FC-4430 (manufactured by Sumitomo 3M Ltd.); FSO, FSO-100, FSN, FSN-100, FS-300 (manufactured by Dupont); and FT-250, 251 (manufactured by Neos Company Limited). The fluorine-based surfactant may be used singly, or two or more types thereof may be used in combination.

Examples of the silicone-based surfactant include a polysiloxane-based compound and a polyether-modified organosiloxane. Commercially available products of the silicone-based surfactant are not particularly limited, and specific examples thereof include BYK-306, BYK-307, BYK-333, BYK-341, BYK-345, BYK-346, BYK-347, BYK-348, and BYK-349 (Product name: manufactured by BYK Japan K.K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (Product name: manufactured by Shin-Etsu Chemical Co., Ltd.).

The content of the surfactant is preferably in the range of 0.1 parts by mass to 5 parts by mass and more preferably in the range of 0.1 parts by mass to 3 parts by mass with respect to 100 parts by mass of the ink composition. If the content of the surfactant is in the range described above, the wettability of the ink composition deposited on the recording medium can be further enhanced.

Ratio of Deposition Amounts

When the deposition amount in an area in which the deposition amount (mg/inch$^2$) of the resin is the greatest per unit area in the deposition area of the ink jet ink composition on the low-absorbing or non-absorbing recording medium is 100%, the mass ratio between the deposition amount of the resin and the deposition amount of the reactant (resin/reactant) in a deposition area in which the deposition amount of the resin is in the range of 20% or greater to 100% or less is 1.5 or greater, preferably 2.0 or greater, more preferably 3.0 or greater, still more preferably 4.0 or greater, and further still more preferably 5.0 or greater. Also, the mass ratio is further preferably 7.0 or greater. If the mass ratio is 1.5 or greater, the odor can be further suppressed. In addition, the mass ratio between the deposition amount of the resin and the deposition amount of the reactant (resin/reactant) is 16 or less, preferably 15 or less, more preferably 13 or less, and still more preferably 10 or less. If the mass ratio is 16 or less, the bleeding of the obtained recorded matter can be further prevented, and the graininess can be further decreased.

In the deposition area in which the deposition amount of the resin is in the range of 40% to 100%, the mass ratio between the deposition amount of the resin and the deposition amount of the reactant (resin/reactant) is preferably 1.5 or greater, more preferably 2.0 or greater, still more preferably 3.0 or greater, and further still more preferably 4.0 or greater, and particularly more preferably 5.0 or greater. If the mass ratio is 1.5 or greater, the odor can be further suppressed. In addition, the mass ratio between the deposition amount of the resin and the deposition amount of the reactant (resin/reactant) is preferably 16 or less, more preferably 15 or less, and still more preferably 10 or less. If the mass ratio is 16 or less, the bleeding of the obtained recorded matter can be further prevented and the graininess can be further decreased.

In the deposition area in which the deposition amount of the resin is in the range of 60% to 100%, the mass ratio between the deposition amount of the resin and the deposition amount of the reactant (resin/reactant) is preferably 1.5 or greater, more preferably 2.0 or greater, still more preferably 3.0 or greater, further still more preferably 4.0 or greater, and particularly preferably 5.0 or greater. If the mass ratio is 1.5 or greater, the odor can be further suppressed. In addition, the mass ratio between the deposition amount of the resin and the deposition amount of the reactant (resin/reactant) is preferably 16 or less, more preferably 15 or less, and still more preferably 10 or less. If the mass ratio is 16 or less, the bleeding of the obtained recorded matter can be further prevented, and the graininess can be further decreased.

In the deposition area in which the deposition amount of the resin is in the range of 80% to 100%, the mass ratio between the deposition amount of the resin and the deposition amount of the reactant (resin/reactant) is preferably 1.5 or greater, more preferably 2.0 or greater, still more preferably 3.0 or greater, further still more preferably 4.0 or greater, and particularly preferably 5.0 or greater. If the mass ratio is 1.5 or greater, the odor can be further suppressed. In addition, if the mass ratio between the deposition amount of the resin and the deposition amount of the reactant (resin/reactant) is preferably 16 or less, more preferably 15 or less, and still more preferably 10 or less. If the mass ratio is 16 or less, the bleeding of the obtained recorded matter can be more prevented, and the graininess can be further enhanced.

In the recording method according to the embodiment, two or more types of ink composition may be deposited on the low-absorbing or non-absorbing recording medium. In this case, the combination of the two or more types of ink composition is not particularly limited, and examples thereof include a combination of the color ink and the clear ink and a combination of the color ink and the color ink. If the two or more types of ink composition are used, the "deposition amount of the resin" refers to a total deposition amount of the resin contained in the two or more types of ink jet ink composition. The use of the two or more types of ink composition is preferable in that multicolor printing becomes possible and the deposition of the resin becomes possible without coloring caused by the clear ink.

The deposition amount of the resin in the deposition area in which the deposition amount of the resin is 100% is preferably in the range of 0.10 mg/inch$^2$ to 1.4 mg/inch$^2$, more preferably in the range of 0.10 mg/inch$^2$ to 1.2 mg/inch$^2$, and still more preferably in the range of 0.10 mg/inch$^2$ to 1.0 mg/inch$^2$. If the deposition amount of the resin in the deposition area in which the deposition amount of the resin is 100% is 0.10 mg/inch$^2$ or greater, the odor is further suppressed. In addition, if the deposition amount of the resin in the deposition area in which the deposition amount of the resin is 100% is 1.4 mg/inch$^2$ or less, the image quality and the decrease of the odor are further enhanced, and the mass ratio between the deposition amount of the resin and the deposition amount of the reactant can be more easily controlled to be in the range described above.

The lower limit of the mass ratio between the deposition amount of the resin and the deposition amount of the reactant (resin/reactant) in the deposition area in which the deposition amount of the resin is less than 20% is preferably 1.5 or greater, more preferably 2.0 or greater, still more preferably 3.0 or greater, further still more preferably 4.0 or greater, further preferably 5.0 or greater, and particularly preferably 7.0 or greater. In addition, the upper limit of the mass ratio between the deposition amount of the resin and the deposition amount of the reactant (resin/reactant) is 16 or less, preferably 15 or less, more preferably 13 or less, and still more preferably 10 or less. If the mass ratio is in the range, bleeding of the obtained recorded matter is further prevented, and the graininess can be further enhanced.

The lower limit of the deposition amount of the reactant in the deposition area in which the deposition amount of the resin is 100% is preferably 0.0050 mg/inch$^2$ or greater, more preferably 0.010 mg/inch$^2$ or greater, and still more preferably 0.020 mg/inch$^2$ or greater, and the upper limit thereof is preferably 0.10 mg/inch$^2$ or less, more preferably 0.070 mg/inch$^2$ or less, and still more preferably 0.050 mg/inch$^2$ or less. If the coating amount of the reactant is in the range described above, it is preferable in that the enhancement of the image quality and the decrease of the odor are further excellent and the mass ratio between the deposition amount of the resin and the deposition amount of the reactant can be easily controlled to the range described above.

Recording Apparatus

Subsequently, the recording apparatus that can use the recording method according to the embodiment is described. FIGURE is a side view schematically illustrating an example of the entire ink jet recording apparatus 1 obtained by using the embodiment. As illustrated in FIGURE, an ink jet recording apparatus 1 includes a feeding portion 10 for a recording medium, a transportation portion 20, a recording portion 30, a drying portion 90, and a discharging portion 70.

Among them, the drying portion 90 includes a first drying portion 40 that dries a reaction liquid and a second drying portion 50 that dries the recorded matter obtained by the recording method according to the embodiment.

In addition, the feeding portion 10 is installed so that a roll recording medium F can be fed to the transportation portion 20. Specifically, the feeding portion 10 has a roll medium holder 11, and the roll medium holder 11 holds the roll recording medium F. Also, the recording medium F is configured to be fed to the transportation portion 20 on the downstream side in the feeding direction Y by rotating the roll recording medium F.

Further, the transportation portion 20 is installed so that the recording medium F fed from the feeding portion 10 can be transported to the recording portion 30. Specifically, the transportation portion 20 has a first feeding roller 21, and is configured to transport the fed recording medium F to the recording portion 30 on the further downstream side in the feeding direction Y.

In addition, the recording portion 30 is installed so as to perform recording by applying the reaction liquid to the recording medium F fed from the transportation portion 20 and ejecting the ink composition. Specifically, the recording portion 30 includes heads 31 and 32 that perform a reaction liquid deposition step, a recording head 33 that performs an ink composition deposition step, and a platen 34 as a medium supporting portion.

Among them, the platen 34 is installed so as to support the recording medium F from the rear surface. In addition, the first drying portion 40 that dries the reaction liquid deposited on the recording medium F and the ink composition deposited on the recording medium F is provided in the platen 34. Further, a second feeding roller 43 is provided on the downstream side of the platen 34 in the feeding direction Y. Also, the second feeding roller 43 is configured so that the recorded recording medium F is fed to the second drying portion 50 on the downstream side in the feeding direction Y.

In addition, the second drying portion 50 is configured to further dry the reaction liquid deposited on the recording medium F and the ink composition deposited on the recording medium F. Further, a third feeding roller 65 is provided near an outlet 64 of the second drying portion 50. The third feeding roller 65 is arranged so as to come into contact with the rear surface of the recording medium F, and is configured to feed the recording medium F to the discharging portion 70 on the downstream side in the feeding direction Y.

Further, the discharging portion 70 feeds the recording medium F fed from the second drying portion 50 on the further downstream side in the feeding direction Y, and discharges the recording medium F to outside of the ink jet recording apparatus 1. Specifically, the discharging portion 70 includes a fourth feeding roller 71, a fifth feeding roller 72, a sixth feeding roller 73, a seventh feeding roller 74, and a winding roller 75. Among them, the fourth feeding roller 71 and the fifth feeding roller 72 are arranged so as to come into contact with the surface of the recording medium F. In addition, the sixth feeding roller 73 and the seventh feeding roller 74 are arranged to form a roller pair. Also, the recording medium F discharged by the sixth feeding roller 73 and the seventh feeding roller 74 is installed so as to be rolled by the winding roller 75.

Examples

Hereinafter, the invention is described in detail with reference to examples and comparative examples. The invention is not limited at all by the examples below.

The main components for the ink composition used in the examples and the comparative examples below are as follows.

Reaction liquid composition
  Reactant
    Magnesium acetate (carboxylate)
    Acetic acid (carboxylic acid)
  Penetrating solvent
    1,2-Hexanediol
  Humectant
    Propylene glycol
Ink composition
  Pigment
    Pigment Blue 15:4 (cab-o-jet 450c manufactured by Cabot Corporation)
  Resin
    Chemipearl S650 (Product Name: manufactured by Mitsui Chemicals Inc., Increase rate: 300 times)
    Chemipearl S75N (Product Name: manufactured by Mitsui Chemicals Inc., Increase rate: 32 times)
  Penetrating solvent
    1,2-Hexanediol
  Surfactant
    PD503A
  Humectant
    Propylene glycol Preparation of Reaction Liquid and Ink Composition Respective materials were mixed with each other in compositions presented in Tables 1 and 2 and were sufficiently stirred, to obtain Reaction Liquids 1 and 2 and ink compositions (Color 1 to 4, Clear 1 and 2). In addition, in Table 1 below, the unit of the numerical values is % by mass, and the total is 100.0% by mass.

Rate of Increase of Particle Diameter of Resin Fine Particle

An aqueous resin solution containing 0.5% by mass of the resin fine particle and the aqueous solution containing 3% by mass of magnesium acetate as the reactant were mixed so that the solid content mass ratio between the resin fine particle and the reactant (resin/reactant) was 3, to manufacture the mixed liquid. The volume average particle diameters of the resin fine particles in the mixed liquid and the aqueous resin solution were measured by using a dynamic light scattering-type Nanotrac particle size distribution meter UPA-EX150 (manufactured by Nikkiso Co., Ltd.), and the ratio of the particle diameter of the resin fine particle in the mixed liquid to the particle diameter of the resin fine particle in the aqueous resin solution was calculated.

TABLE 1

| Reaction liquid composition | | Reaction Liquid 1 | Reaction Liquid 2 |
|---|---|---|---|
| Reactant | Magnesium acetate (polyvalent metallic salt) | 2 | — |
| | Acetic acid | — | 2 |
| Penetrating solvent | 1,2-Hexanediol | 5 | 5 |
| Humectant | Propylene glycol | 20 | 20 |
| Balance | Water | Residual quantity | Residual quantity |
| Total | | 100 | 100 |

TABLE 2

| Ink composition | | Color 1 | Color 2 | Color 3 | Color 4 | Clear 1 | Clear 2 |
|---|---|---|---|---|---|---|---|
| Pigment | Pigment Blue 15:4 | 5 | 5 | 5 | 5 | — | — |
| Resin | Chemipearl S650 (Increase rate: 300 times) | 1 | 7 | 10 | — | 10 | — |
| | Chemipearl S75N (Increase rate: 32 times) | — | — | — | 1 | — | 10 |
| Penetrating solvent | 1,2-Hexanediol | 5 | 5 | 5 | 5 | 5 | 5 |
| Surfactant | PD503A | 1 | 1 | 1 | 1 | 1 | 1 |
| Humectant | Propylene glycol | 20 | 20 | 20 | 20 | 20 | 20 |
| Balance | Water | Residual quantity | Residual quantity | Residual quantity | Residual quantity | Residual quantity | Residual quantity |
| Total | | 100 | 100 | 100 | 100 | 100 | 100 |

Production of Recording Sample

The reaction liquid was ejected from a nozzle array of the recording apparatus (PX-G930 manufactured by Seiko Epson Corp.), and the reaction liquid was deposited in the coating amounts shown in Tables 3 and 4 on the recording medium (Lumirror S10, polyester film manufactured by Toray Industries, Inc.). The deposition area of the reaction liquid was set to have the size of 5×5 cm, and the recording resolution was set to be 720×720 dpi.

Subsequently, the ink composition was ejected from a different nozzle array in the same recording apparatus, and was deposited to overlap the deposition area of the reaction liquid in the coating amounts shown in Tables 3 and 4. The deposition area of the ink composition was set to have the size of 5×5 cm, and the recording resolution was set to be 720×720 dpi. Thereafter, the obtained recorded matter was dried for 10 minutes at 40° C.

In addition, Reaction Liquid 1 and Color 1 were used in Recording Example 1, Reaction Liquid 1 and Color 2 were used in Recording Example 2, Reaction Liquid 1 and Color 3 were used in Recording Example 3, Reaction Liquid 1 and Color 4 were used in Recording Example 4, Reaction Liquid 2 and Color 1 were used in Recording Example 5, and Reaction Liquid 2 and Color 1 were used in Recording Example 6. In addition, coated paper (Product Name: "OK overcoat N" manufactured by Oji Paper Co., Ltd.) was used instead of the recording medium in Recording Example 6.

In addition, in Recording Examples 1 to 4, the clear ink composition was used in a portion of the examples and the comparative examples. Specifically, the clear ink composition was ejected from a different nozzle array of the recording apparatus (PX-G930 manufactured by Seiko Epson Corp.), and was deposited to overlap the pattern of the ink composition in the coating amounts described in Tables 3 and 4. The deposition area of the clear ink composition was set to have the size of 5×5 cm, and the recording resolution was set to be 720×720 dpi.

The deposition amount of the reaction liquid, the deposition amount of the reactant, the deposition amount of the ink composition, and the deposition amount of the resin were controlled by adjusting the liquid droplet amount per one ink droplet, and adjusting image pixels.

Determination of Odor

Ten people smelled the odor of the recorded matter obtained in this manner, to perform the sensory evaluation. Based on the number of people among the ten people who sensed the odor, the odor was determined according to evaluation criteria as follows.

A: No persons sensed odor
B: 1 to 3 people sensed odor
C: 4 or more people sensed odor Determination of Image Quality The pattern on the recorded matter obtained in this manner was visually observed, to determine whether there was bleeding (there was portion in which ink was blurred near a pattern) and graininess (ink is not even inside a pattern and spots were seen).

A: No bleeding and no graininess were recognized
B: No bleeding was recognized, but graininess was recognized
C: bleeding and graininess were recognized

TABLE 3

| | Reaction liquid | | | Ink composition (color) | | Ink composition (clear) | | Total deposition amount of resin [mg/inch²] | Ratio A | Ratio B | Image quality | Odor | |
|---|---|---|---|---|---|---|---|---|---|---|---|---|---|
| | Reaction liquid name | Reaction liquid deposition amount [mg/inch²] | Reactant deposition amount [mg/inch²] | Ink name | Ink deposition amount [mg/inch²] | Resin deposition amount [mg/inch²] | Ink name | Ink deposition amount [mg/inch²] | Resin deposition amount [mg/inch²] | | | | | |
| Recording Example 1 | Reaction Liquid 1 | 2.00 | 0.04 | Color 1 | 1.36 | 0.0136 | Clear 1 | 0.07 | 0.07 | 0.0206 | 0.5 | 20.6 | A | C | Comparative Example |
| | | 2.00 | 0.04 | | 1.36 | 0.0136 | Clear 1 | 0.85 | 0.85 | 0.0986 | 2.5 | 98.6 | A | A | Example |
| | | 2.00 | 0.04 | | 1.36 | 0.0136 | Clear 2 | 0.85 | 0.85 | 0.0986 | 2.5 | 98.6 | B | B | Example |
| | | 2.00 | 0.04 | | 3.00 | 0.0300 | — | — | — | 0.0300 | 0.8 | 30.0 | A | C | Comparative Example |
| | | 1.00 | 0.02 | | 3.00 | 0.0300 | — | — | — | 0.0300 | 1.5 | 30.0 | A | A | Example |
| | | 0.08 | 0.0016 | | 3.00 | 0.0300 | — | — | — | 0.0300 | 18.8 | 30.0 | C | A | Comparative Example |
| | | 2.00 | 0.04 | | 4.50 | 0.0450 | — | — | — | 0.0450 | 1.1 | 45.0 | A | C | Comparative Example |
| | | 2.00 | 0.04 | | 6.00 | 0.0600 | — | — | — | 0.0600 | 1.5 | 60.0 | A | A | Example |
| | | 2.00 | 0.04 | | 7.50 | 0.0750 | — | — | — | 0.0750 | 1.9 | 75.0 | A | A | Example |
| | | 2.00 | 0.04 | | 8.50 | 0.0850 | — | — | — | 0.0850 | 2.1 | 85.0 | A | A | Example |
| | | 2.00 | 0.04 | | 9.00 | 0.0900 | — | — | — | 0.0900 | 2.3 | 90.0 | B | A | Example |
| | | 2.00 | 0.04 | | 10.00 | 0.1000 | — | — | — | 0.1000 | 2.5 | 100.0 | B | A | Example |
| | | 4.00 | 0.04 | | 10.00 | 0.1000 | — | — | — | 0.1000 | 1.3 | 100.0 | B | C | Comparative Example |
| | | 0.30 | 0.0060 | | 10.00 | 0.1000 | — | — | — | 0.1000 | 16.7 | 100.0 | C | A | Comparative Example |
| Recording Example 2 | Reaction Liquid 1 | 5.00 | 0.10 | Color 2 | 0.07 | 0.0049 | Clear 1 | 1.30 | 0.130 | 0.1349 | 1.3 | 21.2 | A | C | Comparative Example |
| | | 2.00 | 0.04 | | 0.30 | 0.0210 | Clear 1 | 1.36 | 0.136 | 0.1570 | 3.9 | 24.6 | A | A | Example |
| | | 2.00 | 0.04 | | 0.30 | 0.0210 | Clear 2 | 1.36 | 0.136 | 0.1570 | 3.9 | 24.6 | B | B | Example |
| | | 9.00 | 0.18 | | 1.00 | 0.0700 | Clear 1 | 0.60 | 0.060 | 0.1300 | 0.7 | 20.4 | A | C | Comparative Example |
| | | 2.00 | 0.04 | | 1.50 | 0.1050 | Clear 1 | 0.30 | 0.030 | 0.1350 | 3.4 | 21.2 | A | A | Example |
| | | 2.00 | 0.04 | | 3.00 | 0.2100 | — | — | — | 0.2100 | 5.3 | 33.0 | A | A | Example |
| | | 2.00 | 0.04 | | 4.50 | 0.3150 | — | — | — | 0.3150 | 7.9 | 49.5 | A | A | Example |

TABLE 3-continued

| | Reaction liquid | | Ink composition (color) | | Ink composition (clear) | | Total deposition amount of resin [mg/inch²] | Ratio A | Ratio B | Image quality | Odor | |
|---|---|---|---|---|---|---|---|---|---|---|---|---|
| Reaction liquid name | Reaction liquid deposition amount [mg/inch²] | Reactant deposition amount [mg/inch²] | Ink name | Ink deposition amount [mg/inch²] | Resin deposition amount [mg/inch²] | Ink name | Ink deposition amount [mg/inch²] | Resin deposition amount [mg/inch²] | | | | | |
| | 2.00 | 0.04 | | 6.00 | 0.4200 | — | — | — | 0.4200 | 10.5 | 65.9 | A | A | Example |
| | 2.00 | 0.04 | | 7.50 | 0.5250 | — | — | — | 0.5250 | 13.1 | 82.4 | A | A | Example |
| | 2.00 | 0.04 | | 8.30 | 0.5810 | — | — | — | 0.5810 | 14.5 | 91.2 | A | A | Example |
| | 2.00 | 0.04 | | 9.10 | 0.6370 | — | — | — | 0.6370 | 15.9 | 100.0 | B | A | Example |
| | 2.00 | 0.04 | | 9.80 | 0.6860 | — | — | — | 0.6860 | 17.2 | 107.7 | C | A | Comparative Example |

Ratio A: Mass ratio between deposition amount of resin and deposition amount of reactant (resin/reactant) in deposition area in which deposition amount of resin was in a range of 20% to 100%
Ratio B: Mass ratio of deposition amount of resin in each example or comparative example to deposition amount of resin in deposition area in which deposition amount of resin was 100% in each recording example

TABLE 4

| | Reaction liquid | | | Ink composition (color) | | | Ink composition (clear) | | | Total deposition amount of resin [mg/inch²] | Ratio A | Ratio B | Image quality | Odor | |
|---|---|---|---|---|---|---|---|---|---|---|---|---|---|---|---|
| | Reaction liquid name | Reaction liquid deposition amount [mg/inch²] | Reactant deposition amount [mg/inch²] | Ink name | Ink deposition amount [mg/inch²] | Resin deposition amount [mg/inch²] | Ink name | Ink deposition amount [mg/inch²] | Resin deposition amount [mg/inch²] | | | | | | |
| Recording Example 3 | Reaction Liquid 1 | 8.00 | 0.16 | Color 3 | 0.10 | 0.0100 | Clear 1 | 2 | 0.200 | 0.2100 | 1.3 | 20.0 | A | C | Comparative Example |
| | | 2.00 | 0.04 | | 0.50 | 0.0500 | Clear 1 | 1.6 | 0.160 | 0.2100 | 5.3 | 20.0 | A | A | Example |
| | | 2.00 | 0.04 | | 2.10 | 0.2100 | — | — | — | 0.2100 | 5.3 | 20.0 | A | A | Example |
| | | 2.00 | 0.04 | | 4.30 | 0.4300 | — | — | — | 0.4300 | 10.8 | 41.0 | A | A | Example |
| | | 2.00 | 0.04 | | 6.30 | 0.6300 | — | — | — | 0.6300 | 15.8 | 60.0 | A | A | Example |
| | | 2.00 | 0.04 | | 8.50 | 0.8500 | — | — | — | 0.8500 | 21.3 | 81.0 | C | A | Comparative Example |
| | | 2.00 | 0.04 | | 10.50 | 0.0150 | — | — | — | 1.0500 | 26.3 | 100.0 | C | A | Comparative Example |
| | | 3.40 | 0.07 | | 10.50 | 0.0150 | — | — | — | 1.0500 | 15.4 | 100.0 | B | A | Example |
| Recording Example 4 | Reaction Liquid 1 | 2.00 | 0.04 | Color 4 | 1.50 | 0.0150 | Clear 1 | 0.03 | 0.003 | 0.0180 | 0.5 | 20.0 | A | C | Comparative Example |
| | | 2.00 | 0.04 | | 1.50 | 0.0150 | Clear 1 | 0.75 | 0.075 | 0.0900 | 2.3 | 100.0 | A | A | Example |
| | | 2.00 | 0.04 | | 1.50 | 0.0150 | Clear 2 | 0.75 | 0.075 | 0.0900 | 2.3 | 100.0 | B | B | Example |
| | | 2.00 | 0.04 | | 2.72 | 0.0272 | — | — | — | 0.0272 | 0.7 | 30.2 | B | C | Comparative Example |
| | | 2.00 | 0.04 | | 4.08 | 0.0408 | — | — | — | 0.0408 | 1.0 | 45.3 | B | C | Comparative Example |
| | | 2.00 | 0.04 | | 6.00 | 0.0600 | — | — | — | 0.0600 | 1.5 | 66.7 | B | B | Example |
| | | 2.00 | 0.04 | | 7.50 | 0.0750 | — | — | — | 0.0750 | 1.9 | 83.3 | B | B | Example |
| | | 2.00 | 0.04 | | 9.00 | 0.0900 | — | — | — | 0.0900 | 2.3 | 100.0 | B | B | Example |
| Recording Example 5 | Reaction Liquid 2 | 2.00 | 0.04 | Color 1 | 8.50 | 0.0850 | — | — | — | 0.0850 | 2.1 | 85.0 | A | B | Example |
| | | 2.00 | 0.04 | | 9.00 | 0.0900 | — | — | — | 0.0900 | 2.3 | 90.0 | B | B | Example |
| | | 2.00 | 0.04 | | 10.00 | 0.1000 | — | — | — | 0.1000 | 2.5 | 100.0 | B | B | Example |
| | | 4.00 | 0.08 | | 10.00 | 0.1000 | — | — | — | 0.1000 | 1.3 | 100.0 | A | C | Comparative Example |
| | | 0.30 | 0.0060 | | 10.00 | 0.1000 | — | — | — | 0.1000 | 16.7 | 100.0 | C | A | Comparative Example |
| Recording Example 6 | Reaction Liquid 2 | 2.00 | 0.04 | Color 1 | 8.50 | 0.0850 | — | — | — | 0.0850 | 2.1 | 85.0 | A | B | Example |
| | | 2.00 | 0.04 | | 9.00 | 0.0900 | — | — | — | 0.0900 | 2.3 | 90.0 | A | A | Example |
| | | 2.00 | 0.04 | | 10.00 | 0.1000 | — | — | — | 0.1000 | 2.5 | 100.0 | A | A | Example |
| | | 4.00 | 0.08 | | 10.00 | 0.1000 | — | — | — | 0.1000 | 1.3 | 100.0 | A | C | Comparative Example |
| | | 0.30 | 0.0060 | | 10.00 | 0.1000 | — | — | — | 0.1000 | 16.7 | 100.0 | C | A | Comparative Example |

Ratio A: Mass ratio between deposition amount of resin and deposition amount of reactant (resin/reactant) in deposition area in which deposition amount of resin was in a range of 20% to 100%
Ratio B: Mass ratio of deposition amount of resin in each example or comparative example to deposition amount of resin in deposition area in which deposition amount of resin was 100% in each recording example The examples and the comparative examples were compared, and was found that the odor of the reactant was decreased and the high definition recorded matter was obtained according to the recording method of the invention.

In addition, Recording Example 6 is a recording example in which coated paper which is a low-absorbing recording medium was used as the recording medium. Recording Example 6 was entirely more excellent in the image quality and the decrease of the odor than Recording Example 5. However, since the recording medium was the coated paper, water resistance and abrasion resistance of the recorded matter were lower than the recording medium which was the film. Accordingly, it was found that the embodiment was more useful when being used for the non-absorbing recording medium such as the film in that the recorded matter having more excellent water resistance or abrasion resistance was able to be obtained, and the enhancement of the image quality and the decrease of the odor were excellent.

The entire disclosure of Japanese Patent Application No.: 2014-102513, filed May 16, 2014 is expressly incorporated by reference herein.

What is claimed is:

1. An ink jet recording method comprising:
    attaching a reaction liquid and one or more ink jet ink compositions to a low-absorbing or non-absorbing recording medium,
    wherein the reaction liquid contains a reactant which is a carboxylic acid or carboxylate that reacts with a component of the ink jet ink composition,
    wherein the ink jet ink composition contains a resin and water,
    wherein when a deposition amount in an area in which the deposition amount of the resin is the greatest per unit area in a deposition area of the ink jet ink composition on the low-absorbing or non-absorbing recording medium is set to be 100%, the reaction liquid and the ink jet ink composition are deposited so that a mass ratio between the deposition amount of the resin and the deposition amount of the reactant (resin/reactant) in the deposition area in which the deposition amount of the resin is in a range of 20% to 100% is in a range of 1.5 to 16,
    wherein the resin contains a resin fine particle, and
    wherein a particle diameter of the resin fine particle increases by 30 times or more in a first mixed liquid containing the resin fine particle and the reactant so that a solid content mass ratio (resin/reactant) is 3.

2. The ink jet recording method according to claim 1, wherein the reaction liquid and the ink jet ink composition are deposited so that the mass ratio between the deposition amount of the resin and the deposition amount of the reactant (resin/reactant) is in a range of 5.0 to 16.

3. The ink jet recording method according to claim 1, wherein the reaction liquid is deposited on the low-absorbing or non-absorbing recording medium in an ink jet system.

4. The ink jet recording method according to claim 1, wherein the resin contains a resin fine particle or a water soluble resin.

5. The ink jet recording method according to claim 1, wherein two or more ink jet ink compositions are deposited on the low-absorbing or non-absorbing recording medium, and
    wherein the deposition amount of the resin is a total deposition amount of the resin included in the two or more ink jet ink compositions.

6. The ink jet recording method according to claim 1, wherein the ink jet ink composition contains a clear ink composition.

7. The ink jet recording method according to claim 1, wherein the deposition amount of the resin is in a range of 0.10 mg/inch$^2$ to 1.0 mg/inch$^2$, in a deposition area in which the deposition amount of the resin is 100%.

8. The ink jet recording method according to claim 1, wherein the content of the resin is in a range of 0.50% by mass to 15% by mass with respect to a total amount of the ink jet ink composition.

9. The ink jet recording method according to claim 1, wherein the content of the reactant is in a range of 0.50 parts by mass to 15.0 parts by mass, with respect to 100 parts by mass of a total amount of the reaction liquid.

10. The ink jet recording method according to claim 1, wherein an amount of absorbed water of the low-absorbing or non-absorbing recording medium in a Bristow technique from a start of a contact to 30 msec is in a range of 0 mL/m$^2$ to 10 mL/m$^2$.

* * * * *